(12) United States Patent
Mottahedin et al.

(10) Patent No.: US 10,931,368 B2
(45) Date of Patent: *Feb. 23, 2021

(54) METHOD AND APPARATUS FOR TESTING USING A TRANSCEIVER MODULE

(71) Applicant: Cisco Technology, Inc., San Jose, CA (US)

(72) Inventors: Farrokh Mottahedin, San Jose, CA (US); Darren K. Hopcroft, San Jose, CA (US); Brice D. Achkir, San Jose, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 1243 days.

This patent is subject to a terminal disclaimer.

(21) Appl. No.: 14/665,159

(22) Filed: Mar. 23, 2015

(65) Prior Publication Data

US 2016/0248498 A1 Aug. 25, 2016

Related U.S. Application Data

(63) Continuation of application No. 13/212,802, filed on Aug. 18, 2011, now Pat. No. 8,989,589.

(51) Int. Cl.
| | |
|---|---|
| *H04B 10/079* | (2013.01) |
| *H04B 10/40* | (2013.01) |
| *H04B 10/25* | (2013.01) |
| *H04L 9/14* | (2006.01) |
| *H04L 9/30* | (2006.01) |
| *H04L 9/32* | (2006.01) |
| *H04L 29/06* | (2006.01) |

(52) U.S. Cl.
CPC ......... *H04B 10/0791* (2013.01); *H04B 10/25* (2013.01); *H04B 10/40* (2013.01); *H04L 9/14* (2013.01); *H04L 9/30* (2013.01); *H04L 9/3247* (2013.01); *H04L 63/06* (2013.01); *H04L 63/08* (2013.01)

(58) Field of Classification Search
None
See application file for complete search history.

(56) References Cited

U.S. PATENT DOCUMENTS

| | | |
|---|---|---|
| 4,736,100 A | 4/1988 | Vastagh |
| 6,841,733 B2 | 1/2005 | Schiaffino et al. |
| 6,873,800 B1 | 3/2005 | Wei et al. |
| 7,230,961 B2 | 6/2007 | Hofmeister et al. |
| 7,317,743 B2 | 1/2008 | Hofmeister et al. |

(Continued)

*Primary Examiner* — Darren E Wolf
(74) *Attorney, Agent, or Firm* — Baker Botts, LLP

(57) ABSTRACT

An apparatus in one embodiment includes a transceiver housing operable to be inserted into a port of a host system, the port comprising at least a first channel and a second channel. The transceiver housing may be a compact small form-factor (SFP) pluggable module housing. The apparatus also includes a printed circuit board mounted in the transceiver housing and an electrical interface of the printed circuit board operable to interface with the port of the host system. The electrical interface includes a first transmit pin and a first receive pin configured to interface with the first channel of the port and a second transmit pin and a second receive pin configured to interface with the second channel of the port. A first connector couples the first transmit pin and the second receive pin, and a second connector couples the second transmit pin and the first receive pin.

20 Claims, 3 Drawing Sheets

(56) References Cited

U.S. PATENT DOCUMENTS

| | | |
|---|---|---|
| 7,492,798 B2 | 2/2009 | Deng et al. |
| 7,571,094 B2 | 8/2009 | Goudar |
| 7,788,091 B2 | 8/2010 | Goudar |
| 2009/0148108 A1 | 6/2009 | Fujutomi |
| 2009/0214221 A1 | 8/2009 | Li et al. |
| 2010/0028015 A1 | 2/2010 | Hosking |

| 1 | Vee |
| 2 | Tx_fault |
| 3 | Tx_Disable1 |
| 4 | MOD-Def2/SDA |
| 5 | MOD-Def1/SCL |
| 6 | MOD-Def0/TD-2 |
| 7 | TD+2 |
| 8 | Rx_LOS1 |
| 9 | RD+2 |
| 10 | RD-2 |
| 11 | Vee |
| 12 | RD-1 |
| 13 | RD+1 |
| 14 | Rx_Los2 |
| 15 | VCCR |
| 16 | VCCT |
| 17 | Tx_Disable2 |
| 18 | TD+1 |
| 19 | TD-1 |
| 20 | Vee |

US 10,931,368 B2

METHOD AND APPARATUS FOR TESTING USING A TRANSCEIVER MODULE

RELATED APPLICATION

This application is a continuation of U.S. application Ser. No. 13/212,802, filed Aug. 18, 2011, entitled "Method and Apparatus for Testing Using a Transceiver Module."

TECHNICAL FIELD OF THE INVENTION

This invention relates in general to communication systems and more particularly to a method and apparatus for testing a communication system using a transceiver module.

BACKGROUND OF THE INVENTION

Modern mixed communications networks employ various transceiver modules to interface between disparate network types. For example, compact small form-factor pluggable (SFP) transceiver modules are transceivers used to couple fiber optic and electronic host systems and/or networks. Compact SFP modules are designed to be inserted into a port of a host system with an electrical interface. In turn, compact SFP modules provide receptacles for fiber optic cables with a fiber optic interface. Compact SFP modules convert electrical signals received from the host system to optical signals transmitted over the fiber optic network. Compact SFP modules also convert optical signals transmitted over the fiber optic network to electrical signals transmitted to the host system. Host systems and devices in such networks often require that testing and verification procedures be successfully completed before they are released and/or introduced into a communications network. Testing and verification of those systems and devices, however, has proven costly and inefficient.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE PRESENT DISCLOSURE

Overview

The teachings of the present disclosure relate to an apparatus that includes a transceiver housing operable to be inserted into a port of a host system, the port comprising at least a first channel and a second channel. The transceiver housing may be a compact small form-factor (SFP) pluggable module housing. The apparatus also includes a printed circuit board mounted in the transceiver housing and an electrical interface of the printed circuit board operable to interface with the port of the host system. The electrical interface includes a first transmit pin and a first receive pin configured to interface with the first channel of the port and a second transmit pin and a second receive pin configured to interface with the second channel of the port. A first connector couples the first transmit pin and the second receive pin, and a second connector couples the second transmit pin and the first receive pin.

Description

Figures 1, 3:
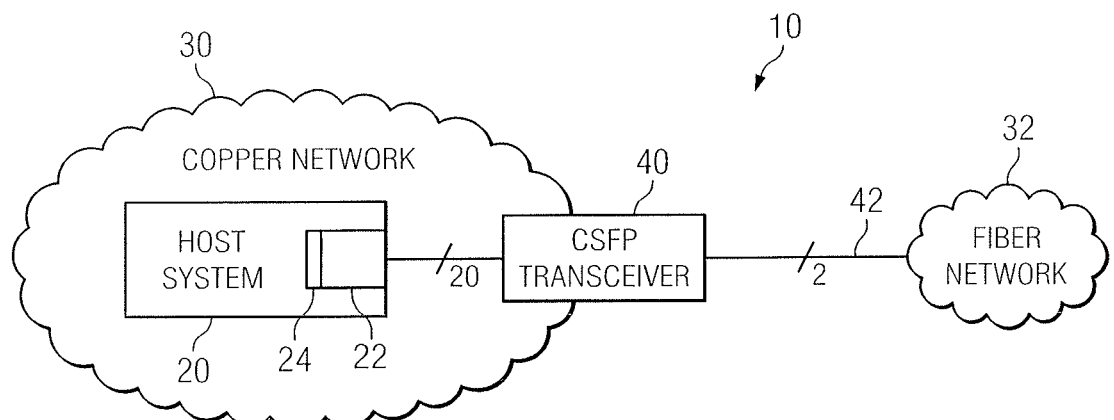
FIG. 1 is a block diagram illustrating an example communication system.
FIG. 3 is a chart illustrating the pin assignment for an electrical interface to a compact SFP module.

FIG. 1 is a block diagram illustrating an example communication system 10. Communication system 10 includes a host system 20, which may form all or a part of a copper network 30. Host system 20 may be connected to a fiber network 32 via a transceiver 40. Host system may include a number of ports 22 that have a receptacle configured to couple an electrical interface of transceiver 40 to a corresponding electrical interface 24 of port 22. Transceiver 40 may be coupled to fiber optic network 32 via fiber connection 42 and may be seated in the receptacle of port 22. In general, host system 20 transmits and receives data over copper network and/or fiber network 32. Transceiver 40 provides connectivity between copper network 30 and fiber optic network 32. Transceiver 40 receives electronic signals from electrical interface 24 of host system 20, converts those signals into optical signals, and transmits the optical signals to fiber optic network 32. Transceiver 40 also receives optical signals from fiber optic network 32, converts those signals into electronic signals, and transmits the electronic signals to host system 20 via electrical interface 24.

Host system 20 represents a switch, router, gateway, hub, or other network device configured to send and receive data. Host system 20 may send and receive data over copper network 30 and may interface with transceiver 40 in order to transmit and receive data from fiber network 32. Host system 20 may include a number of ports 22 configured to receive transceivers 40. Ports 22 may support two or more duplex connections to transceiver 40. Each of ports 22 may have a receptacle configured to allow electrical interface of transceiver 40 to interface with an electrical interface 24 of host system 20. For example, port 22 may be configured to guide a compact SFP transceiver 40 into a receptacle to interface with electrical interface 24. In such embodiments, electrical interface 24 may represent a 20-pin connector compatible with compact SFP transceivers. The pin assignment of an example compact SFP interface is illustrated in FIG. 3. Host system 20 may communicate with copper network 30 and/or fiber network 32 using any number and combination of network protocols such as Ethernet, Fiber channel, and/or other network protocols.

Copper network 30 is a network with at least some copper links and may comprise any number of devices and connections used to support any of a variety of protocols and features. For example, copper network 30 may represent one or more Ethernet or gigabit Ethernet networks. Fiber network 32 is a network with at least some fiber links and may comprise any number of devices and connections used to support any of a variety of communications protocols and features. For example, fiber network 32 may comprise one or more SDH or fiber channel networks. The term network should be interpreted as generally defining any interconnection of components capable of transmitting audio and/or video communications signals, data, messages and other information including signals, data or messages transmitted through streaming media, text, chat, instant messaging, and/or email. Networks described herein may be implemented as or be connected to one or more of a local area network (LAN), a wide area network (WAN), a public switch telephone network (PSTN), and/or a global distributing network such as the Internet, intranet, extranet, or other form of wireless or wireline communication network and may be a combination of network types such as those listed above. Any network components capable of changing an audio, video or other data using friends or packets are included within the scope of particular components.

Transceiver 40 represents a device operable to facilitate communications between copper network 30 and fiber network 32. Each transceiver 40 may be capable of establishing two or more duplex connections between copper network 30 and fiber network 32. Transceiver 40 may, for example, be a compact SFP transceiver capable of duplex fiber connections to fiber network 32. Transceiver 40 converts optical signals to electrical signals and converts electrical signals to optical signals. Accordingly, transceiver 40 may receive optical signals from fiber network 32, convert those optical signals into electronic signals and transmit the electronic signals to electrical interface 24 of host system 20. Transceiver 40 may receive electronic signals from host system 20, convert those electronic signals into optical signals and transmit the optical signals to fiber network 50. Transceiver 40 may be inserted into a corresponding receptacle of port 22 in host system 20. In certain embodiments, inserting transceiver 40 into the receptacle results in a connection between an electrical interface of transceiver 40 and corresponding portions of electrical interface 24. For example, a compact SFP transceiver 40 may include an electrical interface operable to interface with a 20-pin connector of host system 20. Because transceiver 40 may be capable of transmitting data and receiving data over two or more channels, transceiver 40 may be capable of establishing two or more optical connections to fiber network 50.

As discussed above, transceiver 40 and host system may interface using electrical interface 24. In certain embodiments, host system 20 includes electrical interface 24 that has a 20-pin connector, and transceiver 40 has an electrical interface capable of coupling with the 20-pin connector. For example, each portion of the 20-pin connector may interface with a corresponding pin on transceiver 40. A portion of the 20-pin connector may include pins for transmitting and receiving data on each channel of transceiver 40. For example, transceiver 40 may include two channels, with channel 1 including TX +/− pins and RX +/− pins and with channel 2 including TX +/− pins and RX +/−. Other pins of the 20-pin connector may correspond to other functionality appropriate for transceiver 40. An example pin assignment for a compact SFP transceiver 40 is described below with respect to FIG. 3.

Deviations in manufacturing tolerances, component quality, and other circumstances may introduce errors into communications system 20. Accordingly, various components of communication system 10 may require testing to prevent and/or correct such errors prior to sale and/or deployment in a production network environment. For example, host system 20 may be tested before being deployed into communications system 10. Accordingly, testing may be required to ensure that host system 20 will function correctly when introduced into communications system 10. Operational, burn-in, de-bugging, troubleshooting, or other testing may be employed to ensure that host system 20 operates in the intended manner. Such testing may require the use of fiber optic cabling 42 and the use of multiple transceivers 40. For example, two ports 22 of host system 20 may be tested using two transceivers 40 and a fiber optic cable 42. The first port 22 may be coupled to the second port 22 using fiber optic cable 42. Such components are often expensive and/or unreliable. For example, fiber optic cable 42 may be subject to frequent failure. As explained below with respect to FIG. 2, however, transceiver 60 may be employed to test host system 20 without the use of fiber cabling 42 or transceivers 40.

Figure 2:
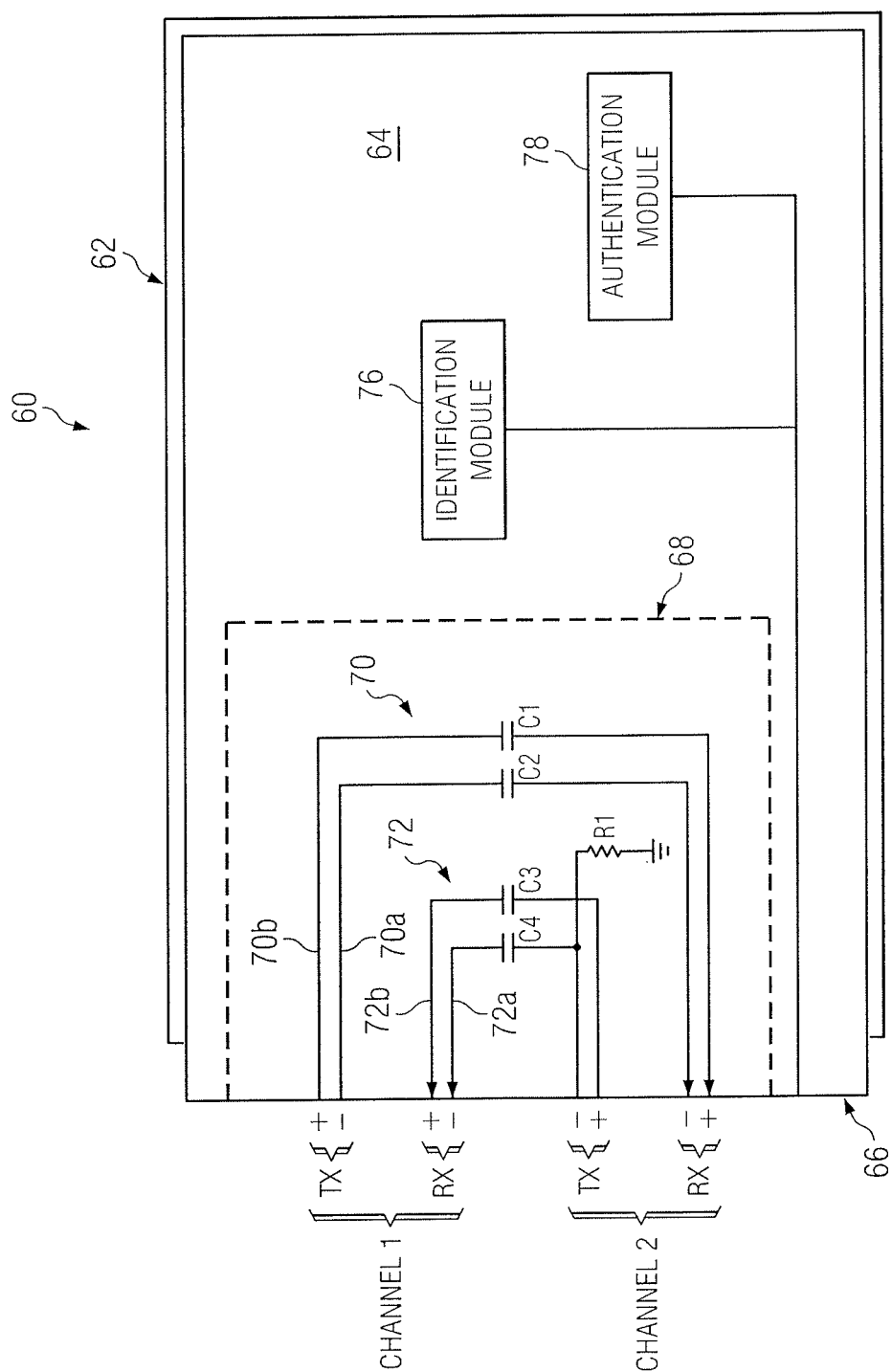
FIG. 2 is a block diagram illustrating an example embodiment of transceiver module for testing a communications system.

FIG. 2 is a block diagram illustrating an example embodiment of a transceiver module 60 for testing communications system 10. In general, transceiver 60 may facilitate testing of host system 20. In particular, transceiver module 60 represents a device operable to facilitate testing of at least two channels of port 22 in host system 20. Transceiver 60 may facilitate loop-back testing of the physical channels of port 22.

Transceiver 60 includes a housing 62 and a printed circuit board 64 that may have an electrical interface 66 and feedback circuit 66. Printed circuit board 64 may be mounted in housing 62. In some embodiments, transceiver module 60 may include identification module 76 and/or authentication module 78. In some embodiments, housing 62 may represent a compact SFP housing. Housing 62 may be operable to be inserted into receptacle of port 22 in a similar manner as was described above with respect to transceiver 40.

Printed circuit board 64 represents one or more substrates having electronic trace connectors. Printed circuit board 64 supports and/or couples the various electrical components of transceiver 60. Printed circuit board 64 may include an electrical interface 66 and feedback circuit 68. Electrical interface 66 may be operable to interface with electrical interface 24 of host system 20. Electrical interface 66 may, for example, represent a 20-pin connector. Accordingly, electrical interface 66 may include pins operable to interface with duplex channels associated with compact SFP transceivers. In the case where transceiver module 60 has a compact SFP housing, the pin assignment of electrical interface 66 may correspond to that described below with respect to FIG. 3.

Feedback circuit 68 may include electrical trace connectors 70 and 72. Trace connectors 70 and 72 may couple the channels of port 22 to each other in pairs. Trace connectors 70 and 72 are operable to couple the transmit pins of channel 1 to the receive pins of channel 2 and the receive pins of channel 1 to the transmit pins of channel 2.

Trace connector 70 may include a pair of connectors 70a and 70b. Likewise, trace connector 72 may include a pair of connectors 72a and 72b. As illustrated, trace connector 70a may couple the TX − pin of channel 1 to the RX − pin of channel 2, and trace connector 70b may couple the TX + pin of channel 1 to the RX + pin of channel 2. Similarly, trace connector 72a may couple the TX − pin of channel 2 to the RX − pin of channel 1, and trace connector 72b may couple the TX + pin of channel 2 to the RX + pin of channel 1. In some embodiments, each of connectors 70a and 70b and connectors 72a and 72b may respectively include a capacitor. Each capacitor C1, C2, C3, and C4 may be of any capacitance suitable to remove DC components of signals transmitted by channels 1 and 2 of port 22. For example, each capacitor may be a 0.01 microfarad capacitor, 0.10 microfarad capacitor, or have other appropriate capacitance. Removing such DC components using capacitors may facilitate high speed data transmission rates. In some embodiments, the TX − pin of channel 2 may also be coupled to ground by a resistor R1. R1 may be of any appropriate resistance. For example, R1 may be approximately 500 ohms. R1 may facilitate compatibility of transceiver 60 with both compact SFP and SFP ports 22 of host system 20.

Using feedback circuit 68, printed circuit board 64 may be operable to receive information from channel 1 of port 22 and transmit that information to channel 2 of port 22. Printed circuit board 64 may also receive information from channel 2 of port 22 and transmit that information to channel 1 of port 22. It should be understood, however, that while an example embodiment of transceiver 60 is illustrated, the teachings of the present disclosure are intended to encompass embodiments of host system 20 having more than two channels per port. In such embodiments, an additional trace connector may be provided for each additional pair of channels.

In some embodiments, trace connectors 70 and 72 may be capable of simulating the signal attenuation and/or losses associated with transmission lines in fiber network 32. Within fiber network 32, signal attenuation may be associated with, for example, the length, quality, and/or other characteristics of fiber optic cables 42 and/or other components of fiber network 32. To simulate such signal attenuation, trace connectors 70 and 72 may utilize areas of printed circuit board 64 to form a pattern, which may lengthen the trace of the connectors and may increase the corresponding signal attenuation. Trace connectors 70 and 72 may in some embodiments be operable to simulate a signal attenuation between 0 decibel and 20 decibels. As another example, trace connectors 70 and 72 may use different materials capable of simulating the loss. In some embodiments, trace connectors 70 and 72 may be connected to microchip attenuators operable to achieve a similar result.

Identification module 76 represents any combination of hardware, software, and controlling logic operable to identify transceiver 60 to host system 20. In the illustrated embodiment, identification module 76 may include an electrically erasable programmable read-only memory (EEPROM). Identification module 76 may be coupled to appropriate pins of electrical interface 66. In some embodiments, authentication module 76 may be mounted on printed circuit board 64. In response to a request from host system 20, identification module 76 may transmit information identifying transceiver 60 to host system 20. For example, identification module 76 may transmit information indicating that transceiver module 60 is a testing module. Alternatively or in addition, identification module 76 may transmit information indicating that transceiver module 60 is a transceiver 40, such as a compact SFP transceiver. In some embodiments, identification module 76 may be capable of identifying the basic function of transceiver module 60 to host system 20. For example, identification module 76 may identify that transceiver module 60 is a test module for use in testing. In other embodiments, identification module 76 may transmit information to host system 20 indicating that transceiver 60 is connected to fiber network 32 even transceiver module 60 it is not actually connected to fiber network 32. Accordingly, identification module 76 may be capable of responding to a request for identification received from host system 20 over electrical interface 24 and electrical interface 66 in any suitable manner that may be expected by host system 20.

Authentication module 78 represents any combination of hardware, software, and controlling logic operable to transmit a cryptographic authentication signature to host system 20. For example, host system 20 may be capable of authenticating transceiver module 60 using a public key authentication (PKA) scheme. Authentication module 78 may be capable of responding to an authentication request via host system 20 by providing information digitally signed with a private key to host system 20. If the private key signature corresponds to a public key on a list of trusted entities stored on host system 20, host system 20 may authenticate transceiver module 60. It should be understood that while a particular method of authentication has been described, the principles of the present disclosure apply to any number and types of authentication schemes.

In operation, transceiver module 60 facilitates testing of host system 20. Transceiver module 60 may be inserted into port 22 in a testing environment. Host system 20 may begin a procedure to initiate transceiver module 60. The procedure may, in some embodiments, be the same procedure host system 20 may use to initiate transceiver 40. For example, host system 20 may request transceiver module 60 to identify itself. Alternatively or in addition, host system 20 may initiate an authentication procedure in which host system 20 determines if transceiver module 60 is a trusted device. After receiving a identification and/or authentication response from transceiver 60, host system 20 may determine whether the identification and/or authentication is valid. If so, host system 20 may allow data to be transmitted and/or received on the channels of port 22 as if port 22 were connected to fiber network 32. In some embodiments, host system 20 may interact with transceiver 60 in a same or similar manner as it would interact with transceiver 40.

Host system 20 may transmit data and receive data over the various channels of port 22. Accordingly, transceiver 60 may simulate the characteristics of fiber network 32 to host system 20. For example, transceiver 60 may receive information on channel 1 and transmit that information to channel 2, and may receive information on channel 2 and may transmit that information to channel 1. If the information transmitted on one channel is confirmed as received on the other, the ability for host system 20 to correctly send and receive data may be confirmed. Alternatively or in addition, other testing procedures may be employed to test and/or simulate various aspects of host system 20.

FIG. 3 is a chart 300 illustrating an example pin assignment for a 20-pin electrical interface 66 to a transceiver 60. In particular, chart 300 may correspond to the pin assignment for a compact SFP transceiver. Thus, a transceiver 60 having a compact SFP transceiver housing may couple to port 22 of host system 20 using the pin assignment described in chart 300.

Chart 300 includes pin assignments for channels 1 and 2 of a compact SFP transceiver operable to be inserted into port 22 of host system 20. In particular, pins 18 (TD+1) and 19 (TD−1) may correspond to the transmit (TX +/−) pins of channel 1, while pins 12 (RD−1) and 13 (RD+1) may correspond to the receive (RX +/−) pins of channel 1. Pins 6 (TD−2) and 7 (TD+2) correspond to the transmit (TX +/−) pins of channel 2. Pins 9 (RD+2) and 10 (RD−2) correspond to the receive (RX +/−) pins of channel 2. In some embodiments, pins 3 and 17 may correspond to transmission disable pins. Transceiver 60 module may include appropriate circuitry operable to enable those pins while transceiver 60 is coupled to port 22 of host station 20. Enabling the transmission disable pins may allow transceiver 60 to provide continuous transmissions during testing.

As described above, feedback circuit 68 may include trace connectors 70 and 72 to couple channel 1 to channel 2. In some embodiments, trace connector 70*a* may couple pin 19 (TD−1) to pin 10 (RD−2), and trace connector 70*b* may couple pin 18 (TD+1) to pin 9 (RD+2). Accordingly, trace connector 72*a* may couple pin 6 (TD−2) to pin 12 (RD−1), and trace connector 72*b* may couple pin 7 (TD+2) to pin 13 (RD+1). Transceiver 60 may also include appropriate electrical connections to couple identification module 68 and/or authentication module 70 to electrical interface 66 as represented by chart 300 in FIG. 3.

Figure 4:
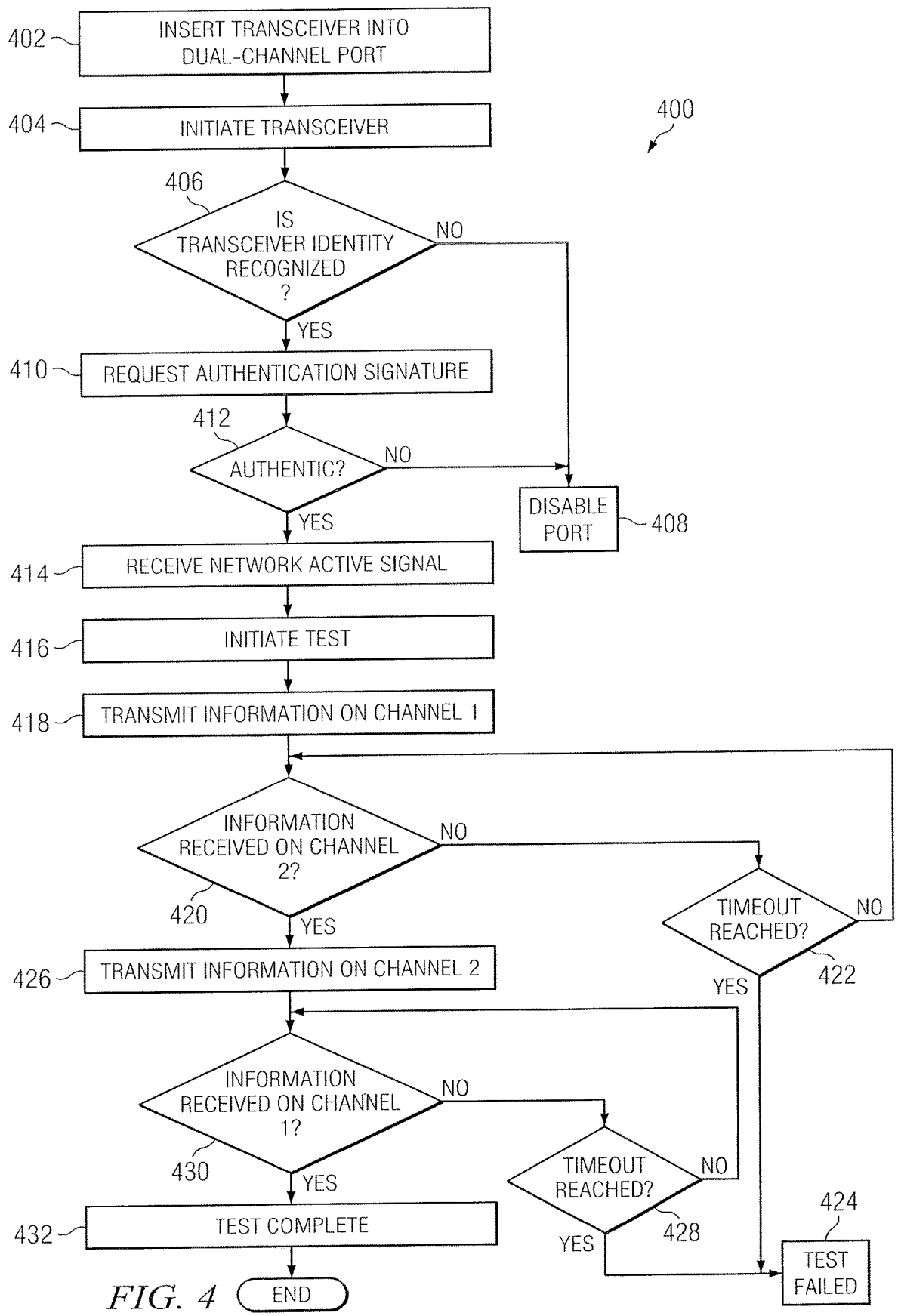
FIG. 4 is a flowchart illustrating an example method for testing a communication system using a transceiver module.

FIG. 4 is a flow chart illustrating an example method of testing a communication system 20 using transceiver module 60. At step 402, transceiver module 60 is inserted in at least a two channel port 22 of host system 20. Host system 20 may, in turn, attempt to initiate transceiver 60 at step 404. For example, this step may include transmitting a identification request to identification module 76 over the appropriate pins of electrical interfaces 24 and 66. In response to the identification request, identification module 76 may transmit identifying information to host system 20. In some embodiments, identification module 76 may also identify its purpose to host system 20. In other embodiments, identification module 76 may transmit information to host system 20 indicating that transceiver module 60 is coupled to fiber network 32 even if it is not.

At step 406, once host system 20 receives the identifying information, host system 20 determines if transceiver 60's identity is recognized. If the identity is not recognized, host system 20 may at step 408 disable port 22. In some embodiments, host system 20 may return and/or indicate an error condition. If the identity is recognized, then the identity of transceiver 60 is approved. At step 410, the host system 20 may request an authentication signature. Once authentication module 78 transmits a digital signature, the signature is authenticated at step 412. If the digital signature is not authenticated then the method may return to step 408.

If transceiver 60 is authenticated, however, then at step 414 host system 20 will receive an active network signal from identity module 76 of transceiver module 60. Accordingly, host system 20 may treat transceiver module 60 as if it is connected to fiber network 32. In some embodiments, transceiver module 60 is not connected to fiber network 32, but is merely providing a feedback circuit between the channels of port 22. Regardless, host system 20 may not know that port 22 is not connected to fiber network 32.

At step 416, a testing procedure may be initiated. A testing procedure may include transmitting information on channel 1 at step 418 and then determining whether information was received on channel 2 at step 420. If the information was not received, then the testing procedure may determine whether a time-out was reached at step 422. If a time out has been reached then the method may proceed to step 424, where the testing procedure may be failed. If at step 422 the time out has not been reached, then the testing procedure may return to step 420. If the information has been received at step 420 then the testing procedure continues to step 426.

At step 426, information is transmitted on channel 2. At step 430, a determination is made as to whether the information transmitted on channel 2 was received on channel 1. If the information was not received, then the testing procedure may determine whether a time-out was reached at step 428. If a time out has been reached then the method may proceed to step 424, where the testing procedure may be failed. If at step 428 the time out has not been reached, then the testing procedure may return to step 430. If the information has been received at step 430 then the testing procedure continues to step 432 and the test completes.

Using the teachings of the present disclosure various transceiver modules 60 may simultaneously and/or sequentially test each port 22 in host system 20. Because the need for expensive cabling has been eliminated the testing procedure is much more streamline and efficient and all is right with the world.

It should be noted that while the method 400 illustrates the first and second channels as being tested sequentially, the method is fully intended to allow various ports 22 of host system 20 to be tested simultaneously using various transceivers 60. The steps illustrated by FIG. 4 as happening sequentially are for the purpose of illustration only. In addition, modifications, additions, or omissions may be made to method 400 illustrated in the flowchart of FIG. 6. For example, method 400 may test ports 22 having more than two channels. In addition, the test procedure described is only an example of a testing procedure that may be used and the teachings of the present disclosure are intended to encompass any number and types of tests that may be appropriate to test the functionality of host system 20 using transceiver 60, including burn-in and other forms of testing. Additionally, the steps of FIG. 4 may be performed in parallel or in any suitable order.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. An apparatus comprising:
   a transceiver housing configured to be inserted into a port of a host system, the port comprising at least a first channel and a second channel;
   a printed circuit board mounted in the transceiver housing and comprising an electrical interface configured to interface with the port of the host system; an
   an identification module mounted on the printed circuit board, the identification module configured to;
   identify the apparatus to the host system; and
   indicate to the host system, during testing of the host system, that the apparatus is connected to a network even if the apparatus is not connected to the network.

2. The apparatus of claim 1, wherein the transceiver housing comprises a compact small form-factor (SFP) pluggable module housing.

3. The apparatus of claim 1, wherein the electrical interface comprises:
   a first connector physically coupling a first transmit pin of the first channel to a second receive pin of the second channel; and
   a second connector physically coupling a second transmit pin of the second channel to a first receive pin of the first channel.

4. The apparatus of claim 1, wherein the electrical interface physcially couples the first and second channels together.

5. The apparatus of claim 1, further comprising an authentication module mounted on the printed circuit board, the authentication module configured to transmit an authentication signature to the host system.

6. The apparatus of claim 1, Wherein the electrical interface is configured to simulate losses associated with fiber optic transmission lines.

7. An apparatus comprising:
   a transceiver housing configured to he inserted into a host system; and
   an identification module coupled to a printed circuit board within the transceiver housing and configured to:
   identity the apparatus to the host system; and
   indicate to the host system, during testing of the host system, that the apparatus is connected to a network even if the apparatus is not connected to the network.

8. The apparatus of claim 7, further comprising a printed circuit board coupled to the transceiver housing, the printed circuit board comprising traces to physically couple a first channel of the host system to second channel of the host system, wherein the printed circuit board is configured to:
receive first information on the first channel and transmit the first information to the second channel; and
receive second information on the second channel and transmit the second information to the first channel.

9. The apparatus of claim 8, further comprising an authentication module mounted on the printed circuit board, the authentication module configured to transmit an authentication signature to the host system.

10. The apparatus of claim 7, wherein the apparatus is configured to physically couple a first channel of the host system and a second channel of the host system together in order to provide loopback testing of the host system.

11. The apparatus of claim 7, wherein the apparatus is configured to simulate losses associated with fiber optic transmission lines.

12. A method comprising:
initiating a transceiver module connected to a port of a host system;
querying an identification module in the transceiver module;
determining the identity of the transceiver module; and
receiving, during testing of the host system, an indication that the transceiver module is connected to a network even if the transceiver module is not connected to the network.

13. The method of claim 12, further comprising performing loophack testing of the host system using the transceiver module.

14. The method of claim 13, wherein the loopback testing comprises:
transmitting first information on a first channel of the host system;
determining that the first information is received on a second channel of the host system;
transmitting second information on the second channel; and
determining that the second information is received on the first channel.

15. The method of claim 12, wherein:
the port comprises a first channel and a second channel; and
the transceiver module comprises traces configured to physically couple the first channel to the second channel in order to provide loophack testing of the host system.

16. The method of claim 12, wherein the transceiver module comprises a printed circuit board (PCB) that is coupled to the compact SFP module housing, the PCB comprising traces configured to physically couple a first channel of the host system to a second channel of the host system in order to provide loophack testing of the host system.

17. The method of claim 12, wherein the transceiver module comprises a compact small form-factor (SFP) pluggable module housing.

18. The method of claim 12, further comprising:
requesting that the transceiver module transmit an authentication signature to the host system;
receiving the authentication signature from the transceiver module; and
authenticating the transceiver module.

19. The method of claim 12, wherein the transceiver module is configured to simulate losses associated with fiber optic transmission lines.

20. The method of claim 12, wherein the transceiver module is configured to physically couple a first channel of the host system and a second channel of the host system together in order to provide loopback testing of the host system.

* * * * *